(12) United States Patent
Kirker et al.

(10) Patent No.: US 7,282,147 B2
(45) Date of Patent: Oct. 16, 2007

(54) CLEANING HOLLOW CORE MEMBRANE FIBERS USING VIBRATION

(75) Inventors: Curtis Kirker, Kamuela, HI (US);
Berkeley F. Fuller, Kamuela, HI (US)

(73) Assignee: Phase Inc., Kamuela, HI (US)

( * ) Notice: Subject to any disclaimer, the term of this patent is extended or adjusted under 35 U.S.C. 154(b) by 374 days.

(21) Appl. No.: 10/958,894

(22) Filed: Oct. 5, 2004

(65) Prior Publication Data
US 2005/0077227 A1 Apr. 14, 2005

Related U.S. Application Data

(60) Provisional application No. 60/509,838, filed on Oct. 7, 2003, provisional application No. 60/509,837, filed on Oct. 7, 2003.

(51) Int. Cl.
*B01D 63/04* (2006.01)
*B01D 63/16* (2006.01)
*B01D 65/02* (2006.01)
*B01D 65/08* (2006.01)
*B01D 63/00* (2006.01)

(52) U.S. Cl. .......................... 210/321.69; 210/321.67; 210/321.79; 210/321.88; 210/412; 210/785

(58) Field of Classification Search ..................... None
See application file for complete search history.

(56) References Cited

U.S. PATENT DOCUMENTS

| | | | |
|---|---|---|---|
| 2,028,168 A | 1/1936 | Roberts | 210/76 |
| 2,538,529 A | 1/1951 | Komline | 233/20 |
| 2,664,905 A | 1/1954 | Harstick | 494/4 |
| 2,688,437 A | 9/1954 | Monnet | 223/20 |
| 3,327,401 A | 6/1967 | Stamos et al. | 34/4 |
| 3,622,003 A | 11/1971 | Czech et al. | 210/108 |
| 3,693,415 A * | 9/1972 | Whittington | 73/619 |
| 3,937,317 A | 2/1976 | Fleury, Jr. | 198/213 |
| 3,940,056 A | 2/1976 | Schmidt | 233/20 |
| 3,960,318 A | 6/1976 | Dahlberg | 233/4 |
| 3,961,746 A | 6/1976 | Werner | 233/20 |
| 3,967,778 A | 7/1976 | Hunwick | 233/7 |
| 3,977,515 A | 8/1976 | Lewoczko | 198/213 |
| 4,005,817 A | 2/1977 | Charlton | 233/22 |

(Continued)

FOREIGN PATENT DOCUMENTS

DE 246696 3/1910

(Continued)

OTHER PUBLICATIONS

International Search Report for EP Application No. 04719722 (4 pages), Sep. 19, 2006.

(Continued)

*Primary Examiner*—Krishnan S. Menon
(74) *Attorney, Agent, or Firm*—Baker Botts L.L.P.

(57) ABSTRACT

A filtration system is provided with hollow membrane filter elements operable to remove solids, particulate and colloidal matter from a process fluid. Acoustic, vibration and ultrasonic energy may be used to clean exterior portions of the hollow membrane filter elements to allow substantially continuous filtration of process fluids. The filtration system may be satisfactorily used with process fluids having a relatively high concentrations of solids, particulate and colloidal matter.

5 Claims, 5 Drawing Sheets

U.S. PATENT DOCUMENTS

| | | | | |
|---|---|---|---|---|
| 4,015,773 A | | 4/1977 | Thylefors | 233/20 |
| 4,027,820 A | | 6/1977 | Kulker | 233/20 |
| 4,067,494 A | | 1/1978 | Willus | 233/3 |
| 4,070,290 A | | 1/1978 | Crosby | 210/91 |
| 4,071,376 A | * | 1/1978 | McNeer | 134/1 |
| 4,083,488 A | | 4/1978 | Gunnewig | 233/20 |
| 4,103,822 A | | 8/1978 | Stroucken | 233/20 |
| 4,149,668 A | | 4/1979 | Zurbruggen | 233/20 |
| 4,164,317 A | | 8/1979 | Nelson | 233/20 |
| 4,190,537 A | | 2/1980 | Tondreau et al. | 210/98 |
| 4,251,023 A | | 2/1981 | Hohne | 233/1 |
| 4,253,962 A | | 3/1981 | Thompson | 210/414 |
| 4,288,029 A | | 9/1981 | Epper et al. | 233/20 |
| 4,298,162 A | | 11/1981 | Hohne | 233/7 |
| 4,311,270 A | | 1/1982 | Hovstadius | 233/46 |
| 4,331,270 A | | 5/1982 | Humlong | 224/32 R |
| 4,343,431 A | | 8/1982 | Wehling | 233/20 |
| 4,375,870 A | | 3/1983 | Bodelson | 494/40 |
| 4,379,976 A | | 4/1983 | Pitchford | 310/83 |
| 4,381,849 A | | 5/1983 | Conant | 494/4 |
| 4,410,319 A | | 10/1983 | Zettier et al. | 494/29 |
| 4,430,221 A | | 2/1984 | Spiewok | 210/380.1 |
| 4,490,133 A | | 12/1984 | Zettier | 494/27 |
| 4,504,262 A | | 3/1985 | Forsberg | 494/53 |
| 4,505,697 A | | 3/1985 | Lee et al. | 494/35 |
| 4,514,183 A | | 4/1985 | Kohlstette | 494/27 |
| 4,519,496 A | | 5/1985 | Ludvegsen | 198/676 |
| 4,543,083 A | | 9/1985 | Bounds | 494/4 |
| 4,569,761 A | | 2/1986 | Spiewok et al. | 210/380.1 |
| 4,581,896 A | | 4/1986 | Andresen | 60/487 |
| 4,629,564 A | | 12/1986 | Pinato | 210/512 |
| 4,643,709 A | | 2/1987 | Lee et al. | 494/37 |
| 4,645,485 A | | 2/1987 | Neimerg | 494/27 |
| 4,698,053 A | | 10/1987 | Stroucken | 494/70 |
| 4,701,158 A | | 10/1987 | Inge et al. | 494/74 |
| 4,707,259 A | | 11/1987 | Doucet | 210/351 |
| 4,710,159 A | | 12/1987 | Gullers | 494/27 |
| 4,717,376 A | | 1/1988 | Bruning et al. | 494/40 |
| 4,721,505 A | | 1/1988 | Inge et al. | 494/74 |
| 4,729,759 A | | 3/1988 | Krook | 494/4 |
| 4,762,615 A | | 8/1988 | Drori | 210/333.01 |
| 4,784,634 A | | 11/1988 | Schiele | 494/56 |
| 4,793,932 A | | 12/1988 | Ford et al. | 210/636 |
| 4,813,923 A | | 3/1989 | Johansson | 494/48 |
| 4,820,256 A | | 4/1989 | Nordstrom | 494/3 |
| 4,840,612 A | | 6/1989 | Pallmar | 494/2 |
| 4,861,329 A | | 8/1989 | Borgstrom et al. | 494/67 |
| 4,876,006 A | | 10/1989 | Ohkubo et al. | 210/321.69 |
| 4,925,442 A | | 5/1990 | Bodelson | 494/40 |
| 4,952,317 A | | 8/1990 | Culkin | 210/636 |
| 4,978,331 A | | 12/1990 | Luchetta | 494/37 |
| 4,995,977 A | | 2/1991 | Hilgendorff et al. | 210/321.69 |
| 5,004,542 A | | 4/1991 | Lyons et al. | 210/356 |
| 5,034,124 A | | 7/1991 | Kopf | 210/231 |
| 5,045,049 A | | 9/1991 | Lantz | 494/70 |
| 5,052,996 A | | 10/1991 | Lantz | 494/68 |
| 5,100,556 A | | 3/1992 | Nichols | 210/651 |
| 5,108,604 A | | 4/1992 | Robbins | 210/321.74 |
| 5,143,613 A | | 9/1992 | Bitter et al. | 210/321.8 |
| 5,182,019 A | | 1/1993 | Cote et al. | 210/321.8 |
| 5,197,939 A | | 3/1993 | Cederkvist | 494/53 |
| 5,202,024 A | | 4/1993 | Andersson et al. | 210/360 |
| 5,225,080 A | | 7/1993 | Karbachsch et al. | 210/321.75 |
| 5,234,605 A | | 8/1993 | Reipur et al. | 210/741 |
| 5,244,584 A | | 9/1993 | Schlieperskoetter | 210/787 |
| 5,275,725 A | | 1/1994 | Ishii et al. | 210/321.67 |
| 5,304,312 A | | 4/1994 | Forster et al. | 210/808 |
| 5,338,284 A | | 8/1994 | Knelson | 494/28 |
| 5,362,292 A | | 11/1994 | Borgstrom et al. | 494/74 |
| 5,366,625 A | | 11/1994 | Pedersen et al. | 210/321.78 |
| 5,374,234 A | | 12/1994 | Madsen | 494/53 |
| 5,380,434 A | | 1/1995 | Paschedag | 210/360 |
| 5,397,471 A | | 3/1995 | Rodebush | 210/360 |
| 5,429,581 A | | 7/1995 | Michand | 494/54 |
| 5,441,651 A | | 8/1995 | Yamaguchi et al. | 210/780 |
| 5,445,771 A | | 8/1995 | Degen | 264/22 |
| 5,500,122 A | | 3/1996 | Schwartz | 210/321.75 |
| 5,575,910 A | | 11/1996 | Karbachsch et al. | 210/321.75 |
| 5,599,271 A | | 2/1997 | Eiken | 494/37 |
| 5,601,522 A | | 2/1997 | Piramoon | 156/172 |
| 5,601,524 A | | 2/1997 | Knelson | 494/29 |
| 5,618,409 A | | 4/1997 | Kreill | 210/97 |
| 5,685,980 A | | 11/1997 | Patapoff et al. | 210/244 |
| 5,725,767 A | | 3/1998 | Culkin | 210/321.75 |
| 5,759,744 A | | 6/1998 | Brueck et al. | 430/312 |
| 5,779,619 A | | 7/1998 | Borgstrom et al. | 494/56 |
| 5,792,037 A | | 8/1998 | Bodelson et al. | 494/40 |
| 5,820,767 A | | 10/1998 | Kane et al. | 210/787 |
| 5,824,217 A | | 10/1998 | Pearl et al. | 210/321.75 |
| 5,922,201 A | | 7/1999 | Yamamori | 210/321.79 |
| 5,979,668 A | | 11/1999 | Kane et al. | 210/446 |
| 6,033,564 A | | 3/2000 | Kirker et al. | 210/232 |
| 6,106,715 A | | 8/2000 | Thalmann et al. | 210/321.83 |
| 6,149,572 A | | 11/2000 | Knelson | 494/37 |
| 6,149,810 A | | 11/2000 | Gonzalez-Martin et al. | 210/321.84 |
| 6,161,435 A | | 12/2000 | Bond et al. | 73/587 |
| 6,221,255 B1 | | 4/2001 | Vadoothker | 210/739 |
| 6,248,053 B1 | | 6/2001 | Ehnstrom et al. | 494/56 |
| 6,312,610 B1 | | 11/2001 | Kirker et al. | 210/781 |
| 6,322,698 B1 | | 11/2001 | Rios et al. | 210/321.75 |
| 6,332,913 B1 | | 12/2001 | Breitschwerdt et al. | 95/55 |
| 6,358,193 B1 | | 3/2002 | Nyberg | 494/2 |
| 6,387,271 B1 | | 5/2002 | Geibel et al. | 210/651 |
| 6,390,964 B1 | | 5/2002 | Mackel | 494/14 |
| 6,416,666 B1 | | 7/2002 | Salyer et al. | 210/321.75 |
| 6,468,198 B1 | | 10/2002 | Mackel | 494/37 |
| 6,565,747 B1 | | 5/2003 | Shintani et al. | 210/321.74 |
| 6,602,325 B1 | | 8/2003 | Frost et al. | 95/96 |
| 6,613,231 B1 | | 9/2003 | Jitariouk | 210/650 |
| 6,656,356 B2 | | 12/2003 | Gungerich et al. | 210/321.8 |
| 6,673,242 B1 | | 1/2004 | Herron | 210/321.74 |
| 6,685,832 B2 | | 2/2004 | Mahendran et al. | 210/321.8 |
| 6,702,941 B1 | | 3/2004 | Haq et al. | 210/315 |
| 6,706,180 B2 | | 3/2004 | Kirker et al. | 210/232 |
| 6,706,189 B2 | | 3/2004 | Rabie et al. | 210/636 |
| 6,708,957 B2 | | 3/2004 | Cote et al. | 261/23.1 |
| 6,739,459 B1 | | 5/2004 | Hartmann | 210/457 |
| 6,770,202 B1 | | 8/2004 | Kidd et al. | 210/650 |
| 6,787,046 B2 | | 9/2004 | De Kock et al. | 210/748 |
| 6,893,563 B2 | | 5/2005 | Grummert | 210/321.84 |
| 6,919,006 B2 | | 7/2005 | Ogle | 204/600 |
| 7,008,540 B1 | * | 3/2006 | Weavers et al. | 210/636 |
| 2002/0158008 A1 | | 10/2002 | Kirker et al. | 210/512.1 |
| 2004/0016699 A1 | | 1/2004 | Bayevsky | 210/636 |

FOREIGN PATENT DOCUMENTS

| | | | |
|---|---|---|---|
| DE | 1755388 | 10/1957 | |
| DE | 1632324 | 10/1970 | |
| DE | 3409107 | 9/1985 | |
| EP | 0346056 | 12/1989 | |
| FR | 870450 | 3/1942 | 14/6 |
| FR | 1038726 | 10/1953 | |
| JP | 2307587 | 12/1990 | |
| JP | 11330379 | 10/1999 | |
| JP | 2001113204 A | 4/2001 | |
| WO | 00/02663 | 1/2000 | |
| WO | 02/42004 A1 | 5/2002 | |

OTHER PUBLICATIONS

Notification Concerning Transmittal of copy of International Preliminary Report on Patentability; PCT/US2004/024664, Mailed Feb. 9, 2006.

Notification Concerning Transmittal of copy of International Preliminary Report on Patentability; PCT/US2004/024661, Mailed Feb. 9, 2006.
PCT Search Report, PCT/US2004/007384, 7 pages, Mailing Date Mar. 11, 2003.
International Search Report and Written Opinion for application No. PCT/US04/20528, 13 pages, Mailing Date Jun. 25, 2004.
International Search Report and Written Opinion for application No. PCT/US04/24664, 10 pages, Mailing Date Mar. 3, 2005.
PCT International Search Report PCT/US04/32817, 13 pages, Mailing Date Jan. 19, 2005.
International Search Report and Written Opinion for application No. PCT/US04/24661, 9 pages, Mailing Date Dec. 9, 2004.
International Search Report PCT/US 99/15891, 6 pages, Jul. 12, 1999.
International Search Report PCT/US 02/13186, Sep. 10, 2002.
International Search Report PCT/US 02/36830, 8 pages, Mar. 12, 2003.
International Search Report PCT/US04/07384, 11 pages, Sep. 15, 2004.
English abstract from the Patent Abstracts of Japan along with a Machine Translation of the rest of the specification of Japanese Patent Publication No. JP 2001113204 A. JP 2001113204 A was published on Apr. 2001.
Supplemental European Search Report for Application No. 04719722 (5 pages), Jan. 18, 2007.

* cited by examiner

CLEANING HOLLOW CORE MEMBRANE FIBERS USING VIBRATION

RELATED APPLICATIONS

This application claims priority to U.S. Provisional Application Ser. No. 60/509,838, filed Oct. 7, 2003, and entitled "Cleaning Hollow Core Membrane Fibers Using Vibration."

This application claims priority to U.S. Provisional Application Ser. No. 60/509,837, filed Oct. 7, 2003, and entitled "Cleaning Hollow Core Membrane Fibers Using Acoustic Vibration Enhanced By Sound Cancellation Or Absorption."

This application is related to co-pending application Ser. No. 10/903,932 filed Jul. 30, 2004, and entitled "Filtration system with enhanced cleaning and dynamic fluid separation and Co-pending application Ser. No. 10/902,771 filed Jul. 30, 2004, and entitled "Filtration system and dynamic fluid separation method"/

TECHNICAL FIELD

The present invention is related in general to the field of fluid separation, and more particularly, to fluid separation systems having hollow fiber membranes or tubes combined with enhanced cleanings of such filter elements.

BACKGROUND OF THE INVENTION

The filtration industry is continuously looking for apparatus and methods to perform filtration for sustained periods, even when processing fluids with high amounts of solids and/or colloidal materials. A wide variety of filter media designs and configurations have been used in attempts to provide continuous filtration processes. This goal has led to several known techniques for continuously inhibiting the buildup of scale, solids cake or films which tend to deposit on and block passage of desired fluid flow through associated filter media. In some cases, these techniques are used intermittently, to perform what is called cyclic cleaning of filter media surfaces, usually when an associated filtration process has been suspended for such cleaning.

Filtration systems generally require periodic removal of clogged filter media or cleaning of filter media to remove particulate matter, solids and/or colloidal matter. Such materials often build up on upstream surfaces of filter media and reduce the rate permeate or clarified fluids may flow through the filter media. Examples include buildup of mineral scale, bridged solids cake or biological films. Intermittently stopping a filtration process to manually or chemically clean upstream surfaces of filter media or to backwash clarified fluid through associated filter media is generally inefficient, labor-intensive and expensive.

Various batch cleaning and manual cleaning techniques have been used, such as backwashing, chemical washing or hand scrubbing of filter media. Other methods for inhibiting or alleviating scaling, caking and/or filming of filter media include application of relatively violent vibration of an entire filtration device parallel to the planes of a plurality of stacked filter media and directing air or other gaseous bubbles under pressure parallel with associated filter media. U.S. Pat. Nos. 4,872,988; 4,952,317; 5,014,564; 5,725,767 and 6,322,698 teach relatively violent reciprocating, torsional vibration of an entire filtration devices parallel to the planes of associated stacked membranes. The patents teach shaking enclosing vessels, stacked filter leaves or plate frame filters along with associated plumbing and connecting devices, and the contained process fluid. Relatively high construction costs may be required to build structures that can withstand these constant reciprocating motions and high amounts of energy often required to generate such motion to provide commercially viable amounts of upstream membrane cleaning, for applications of sufficient value to justify the costs.

Another method used to inhibit membrane clogging by caking, scaling or filming, is the use of air bubbling. U.S. Pat. No. 6,287,467 teaches cleaning parallel mounted flat leaf elements via air bubbling. The associated leaf filter elements generally require maintenance of uniform, structurally braced spacing between each filter leaf element to provide access for air bubbles to all membrane surfaces. The rigidly held membrane surfaces may provide a highly stable platform on which solids cake may build up which the air bubbles can no longer remove such that manual cleaning may be required.

Vibratory techniques such as ultrasonic excitation have been used for sensing membrane conditions, or applied to a single membrane surface, such as in small-scale laboratory explorations. U.S. Pat. No. 6,708,957; RE 37,549; 6,245,239 and 5,910,250 show the use of bubbles directed under pressure between and along upstream surfaces of clusters or skeins of hollow fiber membranes. Materials used to form hollow fiber membranes often attract the growth of scale and/or biological films such that periodic manual cleaning and/or chemical cleaning of such filter media may still be required even when bubbling techniques are used.

SUMMARY OF THE INVENTION

In accordance with teachings of the present invention, a filtration system may be provided with at least one array or cluster of hollow fiber membranes which may be cleaned to inhibit or remove the buildup of solids cake, mineral scale and/or biological films without requiring stopping of an associated filtration process. One aspect of the invention includes either continuously or intermittently removing scale, solids cake, biological films, particulate and/or colloidal matter from exterior portions of hollow fiber membranes to maximize fluid flow through pores or openings in associated membranes and to provide substantially continuous flow of clarified fluid from an associated filtration system.

One aspect of the present invention includes removing or inhibiting build up of mineral scale, solids cake and/or biological films that provide dynamic filtration when one or more arrays of hollow fiber membranes are used as the filter media in a high capacity, commercial filtration system. Dynamic filtration may be generally defined as the use of filter media capable of substantially continuous operation with either no interruption of an associated filtration process or substantially reduced frequency of cleaning associated filter media that interrupts and otherwise substantially continuous filtration process.

Apparatus and methods incorporating teachings of the present invention may be used either continuously or intermittently to provide dynamic filtration depending upon characteristics of an associated filtration system, hollow fiber membranes, process fluid and desired clarified fluid flow rates. A wide variety of electrical, mechanical and electro-mechanical devices may be use to produce vibration energy in accordance with teachings of the present invention. Energy in the form of mechanically induced vibration and/or acoustically induced vibration may be used to clean hollow fiber membranes in accordance with teachings of the present invention. Sonic energy between approximately 15 and 20,000 cycles per second and ultrasonic energy generally greater than 20,000 cycles per second may be use to generate acoustically induced vibration in accordance with teachings of the present invention.

For some applications vibration energy may be equalized, redirected or absorbed to minimize return or bounce back of vibration waves in a closed housing. Undesired return or bounce back of vibration waves may interfere with or diminish the effectiveness of primary vibration energy to produce a desired cleaning effect. Vibration energy absorbing material may be placed at selected locations within a housing to prevent or minimize undesired return of vibration waves. Also, vibration canceling drivers (mechanical or electronic) may be used to prevent or minimize undesired return of vibration waves. Various flow paths may be provided in a closed housing to return primary vibration energy to a location proximate the vibration energy source to enhance rather than diminish effectiveness of the primary vibration energy.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to FIGS. 1A-6 wherein like number refer to same and like parts.

The term "acoustic" energy may be used to describe both sonic energy (generally equal to or less than 20,000 cycles per second) and ultrasonic energy (generally greater than 20,000 cycles per second). Acoustical vibration may be produced by sonic energy and/or ultrasonic energy.

The term "membrane" may be used in this application to mean any material having openings or pores satisfactory for use in separating a process fluid into a clarified fluid stream and a concentrated fluid stream. Membranes satisfactory for use with filtration systems incorporating teachings of the present invention may be formed from woven materials, nonwoven materials and/or perforated plastic films. Various types of membranes may be used to form hollow fiber membranes based upon desired characteristics such as ability to separate liquids from gasses and the ability to separate suspended solids, colloidal matter and particulate matter from a fluid stream. Membrane materials may be selected with desired permeability or porosity for each application.

The term "hollow fiber membrane" may be used to describe any generally hollow elongated tube formed from various types of membrane material. Hollow fiber membranes may also be described as "hollow fiber filter elements", "hollow membrane tubes" and "hollow core membrane fibers".

Process fluid may be generally defined as a fluid stream containing liquids and/or gasses along with suspended solids, colloidal matter and/or particulate matter including, but not limited to, nanoparticles. Fluid permeable membranes may be used to separate various components of a process fluid into a clarified fluid and a concentrated fluid in accordance with teachings of the present invention. Membranes used to separate process fluids may generally be described as having an upstream side which is the side or face communicating with a process fluid. Membranes also have a downstream side or face communicating with clarified fluids removed from the process fluids.

A hollow fiber membrane may be generally described as a hollow tube having a fluid flow path extending longitudinally therethrough. Multiple openings or pores may be formed in associated membrane material. The upstream side or upstream surface of a hollow fiber membrane is generally the exterior surface of the membrane material exposed to process fluids. The downstream side or downstream surface of a hollow fiber membrane is generally the interior surface of the membrane material. The flow path will generally collect clarified fluid which flows through the pores or openings in the membrane material. For some applications the interior surface of a hollow fiber membrane may function as the upstream side or upstream surface. However, such applications are often limited to specific types of process fluids.

Clarified fluids may include liquids, gasses, solids, particulate matter and/or colloidal matter which has been able to pass through or permeate through openings in an associated membrane. Clarified fluids may also be referred to as "permeate" or "permeate fluids".

Process fluids passing over the upstream side of a membrane gradually lose associated liquids and/or gaseous components by such components permeating through openings or pores in the membrane. The remaining process fluid generally becomes relatively thicker with a higher concentration of solids, colloidal matter and/or particulate matter which will not pass through openings or pores in the membrane. The accumulation of such materials on the upstream side of a membrane may be referred to as a "retentate" or "concentrated fluid".

The term "fluid" may be used to include liquids, gasses or a combination of liquids and gasses.

The term "housing" may be used to describe any container, tank, chamber, vessel, pressure vessel, cartridge, surrounding housing, frame assembly or any other structure suitable for holding an array of hollow fiber membranes in accordance with teachings of the present invention. Some housings may be open to ambient pressure or may be disposed within a reservoir holding process fluid. Other housing may be capable of holding a positive pressure or a vacuum depending upon requirements of an associated filtration process.

To achieve sufficient surface area for high capacity, commercial filtration applications, multiple flat sheets of filter membranes are frequently collected together within a single filtration device. Various techniques may be used to combine flat sheet filter membranes such as parallel stacks mounted either horizontally or vertically or winding relatively long sheets of flat filter membrane material into various spiral configurations. To achieve sufficient surface area for high capacity, commercial scale filtration systems, a plurality of hollow fiber membranes may be bundled together in parallel arrays or clusters. Such arrays or clusters may sometimes be referred to as "skeins".

Some filtration systems may be formed with a plurality of hollow fiber membranes having only one end of each hollow fiber membrane attached to a single end cap. The opposite end of the hollow fiber membranes may be sealed or closed to prevent undesired fluid flow therethrough. Various features of the present invention may be used with arrays of hollow fiber membranes having only one end cap or a pair of end caps.

The filtration systems shown in FIGS. 1A and 2-6, include a plurality of hollow fiber membranes 50 with opposite ends of each hollow fiber membrane 50 attached to respective end caps 42 and 44. Various features of the present invention, described with respect to hollow fiber membrane array 40, may also be satisfactorily used to with hollow fiber membrane arrays attached to only a single end cap (not expressly shown). Mounting elements other than end caps 42 and 44 may be satisfactorily used.

Figure 1A:
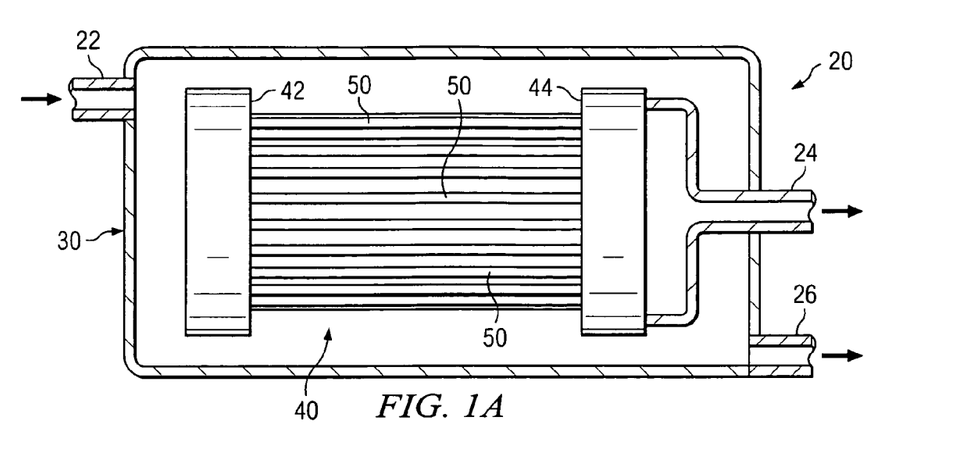
FIG. 1A is a schematic drawing in section with portions broken away showing a filtration system having at least one array of hollow fiber membranes which may be used to separate a process fluid into permeate and retentate.

One example of a filtration system having an array or cluster of hollow fiber membranes is shown in FIG. 1A. For this example filtration system or fluid separation system 20 may include housing 30 with one or more hollow fiber membrane arrays 40 disposed therein. Hollow fiber member array 40 includes a plurality of individual hollow fiber membranes or tubes 50 attached to and bonded with respective end caps 42 and 44. Various techniques may be satisfactorily used to couple respective ends of each hollow fiber membrane 50 with end caps 42 and 44. Some types of end caps may be referred to as "potting heads". See for example U.S. Pat. No. 5,445,771 entitled "Process For Preparing Hollow Fiber Separatory Devices"; U.S. Pat. No. 6,656,356 entitled "Aerated Immersed Membrane System"; U.S. Pat. No. 6,685,832 entitled "Method Of Potting Hollow Fiber Membranes" and U.S. Pat. No. 6,739,459 entitled "Filter Element Including Bonded End Caps And Support Core".

Housing 30 preferably includes at least a first inlet for process fluid, a first outlet for permeate or clarified fluid and a second outlet for retentate or concentrated fluid. For embodiments such as shown in FIG. 1A, housing 30 includes process fluid inlet 22, clarified fluid outlet 24 and retentate outlet 26. For some applications, fluids with increased density and any solids, scale or biological films separated from the process fluid may collect along lower portions of housing 30. Therefore, concentrated fluid outlet 26 may be formed proximate the lower portion of housing 30. Housing 30 may either be open to the atmosphere or may be capable of operating as a pressure vessel depending upon characteristics of the associated process fluid and fluid separation process.

End cap 44 may include multiple flow paths (not expressly shown) communicating with respective fluid flow paths 62 formed within each hollow fiber membrane 50. End cap 44 may function as a permeate or clarified fluid collecting manifold to direct clarified fluid flow from respective fluid flow paths 62 to conduits extending between end cap 44 and clarified fluid outlet 24. For some applications, end cap 42 may also function as a clarified fluid collecting manifold and may be operably coupled with an associated clarified fluid outlet (not expressly shown). Subject to variations in the type of process fluid, associated fluid flow rates and fluid pressure with housing 30, end caps 42 and 44 may be used to maintain relatively constant tension on hollow fiber membranes 50.

Each hollow fiber membrane 50 may have a generally circular configuration defined in part by longitudinal axis 52. See FIGS. 1B and 1C. Each hollow fiber membrane 50 may include generally cylindrical wall 54 having a plurality of pores or opening 56 disposed therein. Openings 56 preferably extend from exterior surface 58 through wall 54 to interior surface 60. Interior surface 60 defines in part fluid flow path 62 extending generally longitudinally through each hollow fiber membrane 50 approximately parallel with longitudinal axis 52. For many applications the dimensions and configurations of each pore or opening 58 may vary along wall 54, particularly for hollow fiber membranes formed from nonwoven materials. See, for example, U.S. Pat. No. 6,770,202 entitled "Porous Membrane".

Figure 1B:
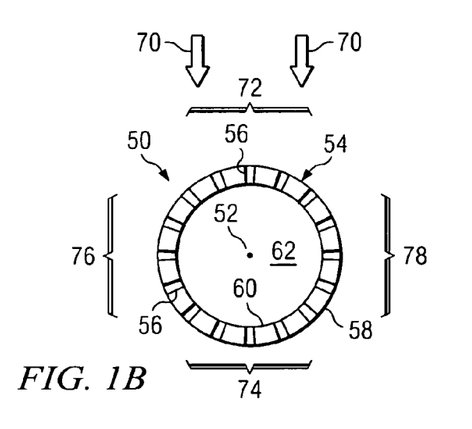
FIG. 1B is a schematic drawing in section with portions broken away of a hollow fiber membrane associated with the filtration system of FIG. 1A.
Figure 1C:
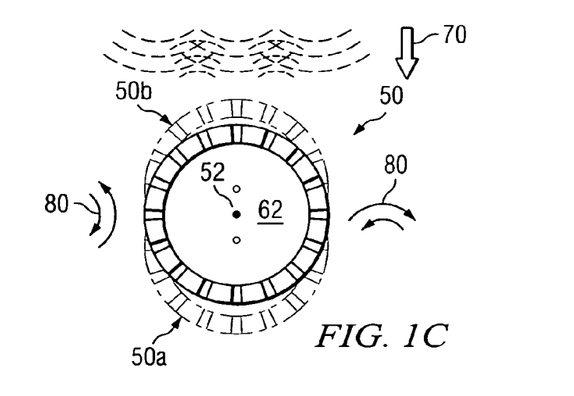
FIG. 1C is a schematic drawing in section with portions broken away showing different positions of a hollow fiber membrane when subjected to vibration in accordance with teachings of the present invention.

For purposes of illustrating various features of the present invention, hollow fiber membrane 50 is shown in FIGS. 1B and 1C with a generally circular cross section relative to longitudinal axis 52. However, the configuration of hollow fiber membranes 50 may vary substantially. For example, hollow fiber membranes 50 may have oval, elliptical and/or circular cross sections depending upon the type of material used to form each hollow fiber membrane 50. The type of process fluid and associated operating pressure of filtration system 20 may also vary the configuration of hollow fiber membranes 50.

Arrows 70 as shown in FIGS. 1B and 1C indicate the general direction of vibration energy which may be applied to hollow fiber membrane 50 in accordance with teachings of the present invention. The vibration energy may be produced by a mechanical energy source or an acoustic energy source. Exterior portions of hollow fiber membrane 50 immediately adjacent to oncoming acoustical energy or vibration energy may be described as leading face 72. Exterior portions of hollow fiber membrane 50 opposite from the direction of acoustical energy or vibration may be described as trailing face 74. Exterior portions 76 and 78 of hollow fiber membrane 50 may be described as "side faces".

As shown in FIG. 1C, vibration energy may have multiple effects upon exterior portions of hollow fiber membrane 50.

One cleaning effect includes reciprocating movement or bouncing of hollow fiber membrane 50 as represented by dotted lines 50*a* and 50*b* in response to vibration energy directed generally perpendicular to longitudinal axis 52. A second cleaning effect includes turbulent scouring of side faces 76 and 78.

Vibration energy and/or acoustical energy may cause movement of process fluids, scale, solid cakes and/or biological films disposed on exterior surface 58 and may also move hollow fiber membrane 50. The process fluid, scale, solids cake, biological film and hollow fiber membrane 50 may each have different rates of movement which results in lifting or removing scale, solids cake and/or biological film from leading face 72 and trailing face 74. The difference in inertia or mass of the process fluid, any scale, solids and/or biological film and each hollow fiber membrane may produce leading face turbulence and trailing face turbulence in response to acoustic and/or vibration energy. Such cleaning effects promote dynamic filtration of the process fluid.

Acoustical energy and/or vibration energy may also create shear forces between the process fluid and side faces 76 and 78. The resulting shear forces may result in turbulent flow of process fluid adjacent to side faces 76 and 78 which lifts or removes any scale, solids cake and/or biological film disposed thereon. Arrows 80 in FIG. 1C indicate such turbulent flow. Cleaning effects associated with turbulent flow adjacent to side faces 76 and 78 also promote dynamic filtration of the process fluid.

Applying vibration energy to an array of hollow fiber membranes 50 in accordance with teachings of the present invention may also result in scraping or scrubbing of adjacent exterior surfaces of hollow fiber membranes 50. Movement of hollow fiber membranes 50 such as shown in FIG. 1C may result in multiple contacts or jostling of adjacent hollow fiber membranes 50 with each other. This third cleaning effect may promote dynamic filtration of the process fluid.

As discussed later in more detail, alternatively relaxing and tensioning hollow fiber membranes 50 may result in exterior portions of adjacent hollow fiber membranes 50 scraping or scouring one another which provides a fourth cleaning effect especially when acoustical energy and/or vibration energy is being applied. See FIGS. 4 and 6. Teachings of the present invention may be used to provide at least four (4) effects to clean or inhibit deposits of scale, solids cake and/or biological films on exterior portions of hollow fiber membranes 50.

Most commercial large scale filtrations systems which contain either multiple flat sheets of membrane material or multiple arrays of hollow fiber membranes must be periodically cleaned to remove solids cake, mineral scale and/or biological films from upstream surfaces of associated filter media. Various examples of apparatus and methods for cleaning exterior portions (upstream surfaces) of hollow fiber membranes during dynamic filtration in accordance with teachings of the present invention are shown in FIGS. 2-6.

Figure 2:
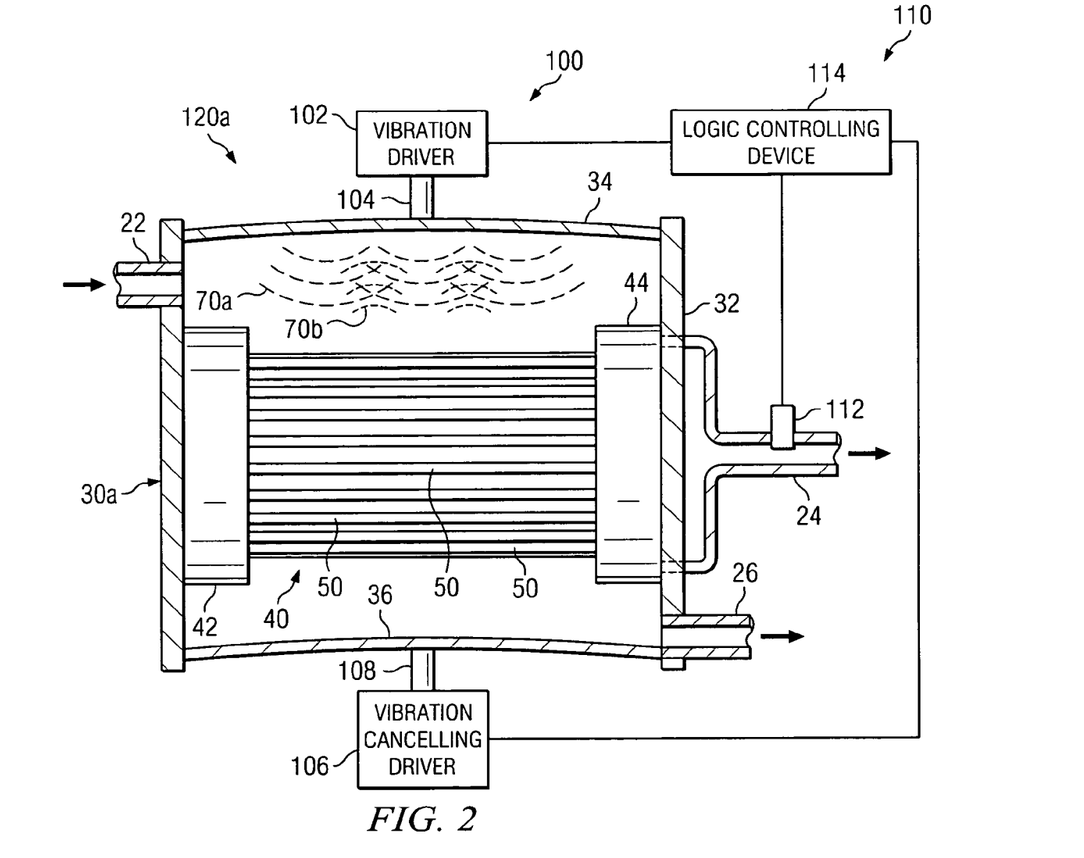
FIG. 2 is a schematic drawing in section with portions broken away showing a filtration system having at least one array of hollow fiber membranes in combination with an energy source operable to clean exterior portions of the hollow fiber membranes in accordance with teachings of the present invention.

Filtration system 120*a* as shown in FIG. 2 combines various features of previously described filtration system 20 with mechanical vibration system 100. As previously noted, the present invention may be used with housings having various configurations. For purposes of describing various features of the present invention as represented by filtration system 120, housing 30*a* may be described as having a generally cylindrical configuration defined in part by wall 32, first end closure 34 and second end closure 36. Cylindrical wall 32 and end closures 34 and 36 may be satisfactorily formed from a wide variety of materials.

Mechanical vibration system 100 preferably includes vibration driver 102 and at least one connector 104 operable to transmit vibration energy from driver 102 to end closure 34. Connector 104 may be a plunger, piston rod or motor driven shaft. Vibration driver 102 may be generally described as a linear, reciprocating mechanical driver. Vibration driver 102 may include an air powered vibration generator, a motor (electrical or hydraulic) powered vibration generator or any other mechanism satisfactory for producing linear reciprocating motion of connector 104.

End closure 34 may sometimes be described as a diaphragm operable to transmit vibration energy represented by waves 70*a*. Hollow fiber membrane array 40 is preferably aligned with end closure 34 such that vibration energy may be directed substantially normal to or perpendicular with leading face 72 of each hollow fiber membrane 50. End cap 42 and 44 may be securely attached with interior portions of wall 32 to maintain substantially constant tension on hollow fiber membranes 50.

Vibration waves 70*a* may be projected along approximately the full length of each hollow fiber membrane 50. For embodiments such as shown in FIG. 2 end caps 42 and 44 may be generally described as "stationary mounting heads" which cooperate with each other to maintain a predetermined amount of tension on associated hollow fiber membranes 50.

For some applications mechanical vibration system 100 may include control system 110. Control system 110 may include one or more permeate flow rate sensors 112 operably coupled with permeate outlet 24. Flow rate sensor 112 may be used to detect permeate rate from outlet 24 and any changes in permeate flow rate. Sensor 112 communicates this information to logic control device 114 which may include instructions to increase or decrease the amplitude and frequency of vibration energy produced by vibration driver 102 to increase or decrease cleaning of associated hollow fiber membranes 50 as appropriate.

When the increase vibration energy has removed any scale, solid cakes and/or biological materials from the exterior portions of hollow fiber membranes 50, flow rate sensor 112 may detect the resulting increased permeate fluid flow rate and signal this change to logic control device 114. Logic control device 114 may then send a signal to vibration driver 102 to change the frequency and/or amplitude of vibration energy applied to exterior surfaces of hollow fiber membranes 50 to reduce the unnecessary energy use. Such changes may be made continuously or at selected time intervals. For some applications, flow rate sensors (not expressly shown) may also be coupled with process fluid inlet 22 and retentenate outlet 26. Information from these sensors may also be communicated to logic control device 114 to regulate the amplitude and frequency of vibration energy produced by vibration driver 102.

For some applications secondary vibration driver or vibration canceling 106 may be operably engaged with end closure 36. At least one connector 108 may transmit vibration energy from driver 106 to end closure 34. Secondary vibration driver 106 and connector 108 may include similar features and characteristics as previously described with respect to vibration driver 102 and connector 104. When vibration waves 70*a* reach end closure 36 opposite from vibration driver 102, control system 110 may send an appropriate signal to secondary vibration canceling driver 106 to actively equalize, cancel or reduce any vibration waves reflected from enclosure 36. Relatively small waves

70b, as shown in FIG. 2, represent the effect of secondary vibration driver 106 equalizing, canceling or reducing primary vibration energy reflected from end closure 36.

For some applications control system 110 may send signals from logic control device 114 to both primary vibration driver 102 and secondary vibration driver 106. One or more sensors (not expressly shown) may be disposed on end closure 36 to detect primary vibration waves 70a and provide an appropriate signal to control system 110. As a result, any changes in the amplitude and/or frequency of primary vibration waves 70a or initiation of vibration waves 70a may result in real-time changes represented by secondary vibration waves 70b.

Vibration energy whether mechanical or acoustical will generally be more effective if the vibration energy is applied uniformly to exterior portions of all hollow fiber membranes disposed within a housing. The use of vibration canceling driver 106 and control system 110 in accordance with teachings of the present invention may result in substantial reduction and/or elimination of interference waves 70b associated with vibration energy returning from or bouncing back from end closure 36. As discussed later with respect to filtration system 120b in FIG. 3, vibration energy absorbing material may also be disposed within selected portions of a housing to substantially reduce or eliminate undesired return or bounce back of primary vibration energy. As a result, the present invention allows primary vibration energy (vibration waves 70a) to produce optimum cleaning and/or unclogging of exterior portions of associated hollow fiber membranes 50.

The following methods and techniques may be used in accordance with teachings of the present invention to reduce, continuously cancel, absorb or redirect primary vibration energy such energy arrives at portions of an associated housing generally located opposite from an associated primary vibration driver. As previously noted, one or more sensing devices may be located at various positions within housing 30a to detect and measure primary vibration waves 70a. Generally such sensing devices will be located opposite from primary vibration driver 102. This location will often be at the greatest distance within housing 30a from primary vibration driver 102. One or more secondary vibration drivers 106 may be located approximately opposite from primary vibration driver 102. Control system 110 may be used to continuously interpret data from associated sensors and provide operating instructions to secondary vibration driver 106 to adjust its associated vibration energy output to actively cancel, equalize or substantially reduce primary vibration waves 70a as they reach end closure 36. The previous comments have been made with respect to mechanical vibration driver such as shown in FIG. 2. However, a primary electrical vibration driver and a secondary electrical vibration driver may also be used to equalize, cancel or reduce primary vibration waves in accordance with teachings of the present invention.

Figure 3:
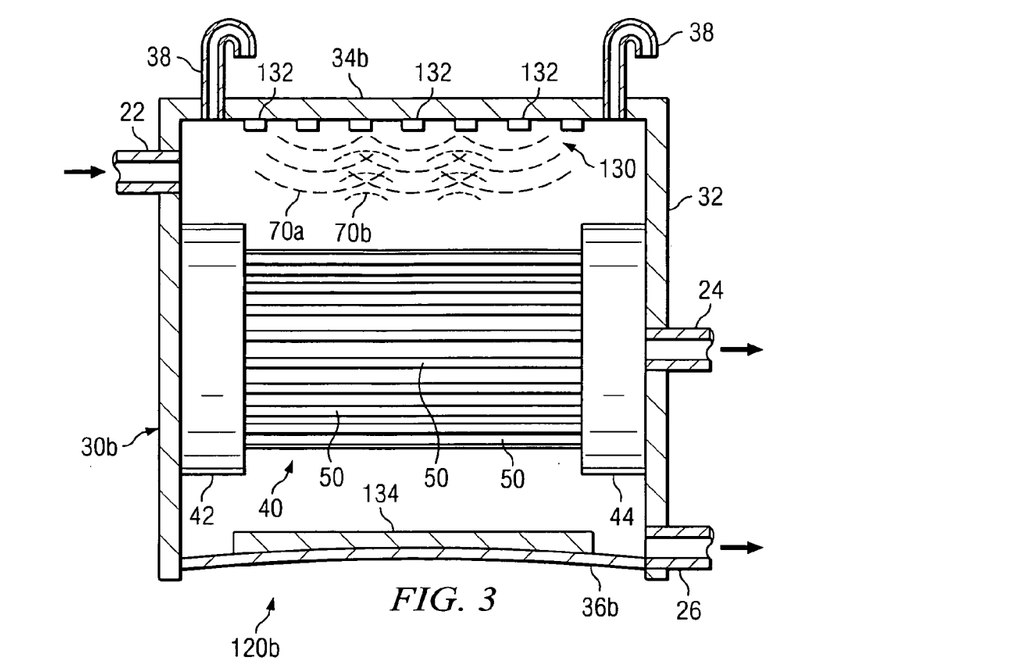
FIG. 3 is a schematic drawing in section and in elevation showing another example of a filtration system having at least one array of hollow fiber membranes combined with multiple energy sources operable to clean exterior portions of the associated filter media in accordance with teachings of the present invention.

Filtration system 120b, as shown in FIG. 3, combines various features of previously described filtration system 20 with electrical vibration system 130 having an array of piezo-electric transducers 132. For some applications piezo-electric transducers 132 may be used to produce sonic energy in the frequency range of approximately fifteen (15) to twenty thousand (20,000) cycles per second to induce vibration waves 70a. For other applications piezo-electric transducers 132 may be used to produce ultrasonic energy (greater than 20,000 cycles per second). The sonic energy may have a generally constant frequency or a variable frequency as appropriate for optimum cleaning of associated hollow fiber membranes 50.

The amplitude and frequency of the acoustic energy may be adjusted to produce desired vibration of hollow fiber membranes 50. For some applications the amplitude and/or frequency of sonic signals produced by transducers 132 may remain constant. For other applications the amplitude and frequency may be intermittently or continuously variable depending upon requirements of an associated dynamic filtration process. A wide variety of electrical energy drivers may be satisfactorily used with primary filtration system 120b. The present invention is not limited to piezo-electric transducers 132.

Housing 30b may have various configurations, including generally cylindrical wall 32. However, end closure 34b may be modified to accommodate attachment of piezo-electric transducers 132. End closure 36b or various other satisfactory end enclosures may be installed within housing 30b. For some applications, one or more layers of vibration energy absorbing material 134 may be disposed on interior portions of end closure 36b opposite from transducers 132. Vibration energy absorbing material 134 may be located and tuned for optimum results. As a result of attaching vibration energy absorbing material 134 with end closure 36b, the amplitude of waves 70b reflected from end closure 36b may be substantially reduced or eliminated.

For other applications, an array of piezo-electric transducers (not expressly shown) may be attached with end closure 36b for use in canceling vibration waves 70a as previously described with respect to filtration system 120a. A control system (not expressly shown) may also be used to vary the amplitude and/or frequency of primary sonic energy produced by transducers 132. For the embodiment shown in FIG. 3, housing 30b may include one or more vents 38 which are open to ambient air pressure exterior to housing 30. For other applications piezo-electric transducers 132 may be satisfactorily used in a sealed or closed housing.

For some applications housing 30b or any other housing formed in accordance with teachings of the present invention may include one or more return paths (not expressly shown) to direct primary vibration waves 70a from end closure 36b to end closure 34b proximate piezo-electric transducers 132. The returned paths may be separate passageways disposed on the exterior of housing 30b. The return paths may be filled with various fluids to provide optimum return of primary vibration waves 70a. As a result, return waves 70b may be substantially reduced or eliminated. The returned vibration waves may be synchronized with primary vibrations waves 70a being generated by transducers 132. Also, by returning substantial amounts of primary vibration waves 70a, the efficiency of an associated primary vibration driver may be enhanced. For other applications one or more passageways or openings may be provided within housing 30b to return primary vibration energy or to direct such primary vibration energy to escape from housing 30b.

Figure 4:
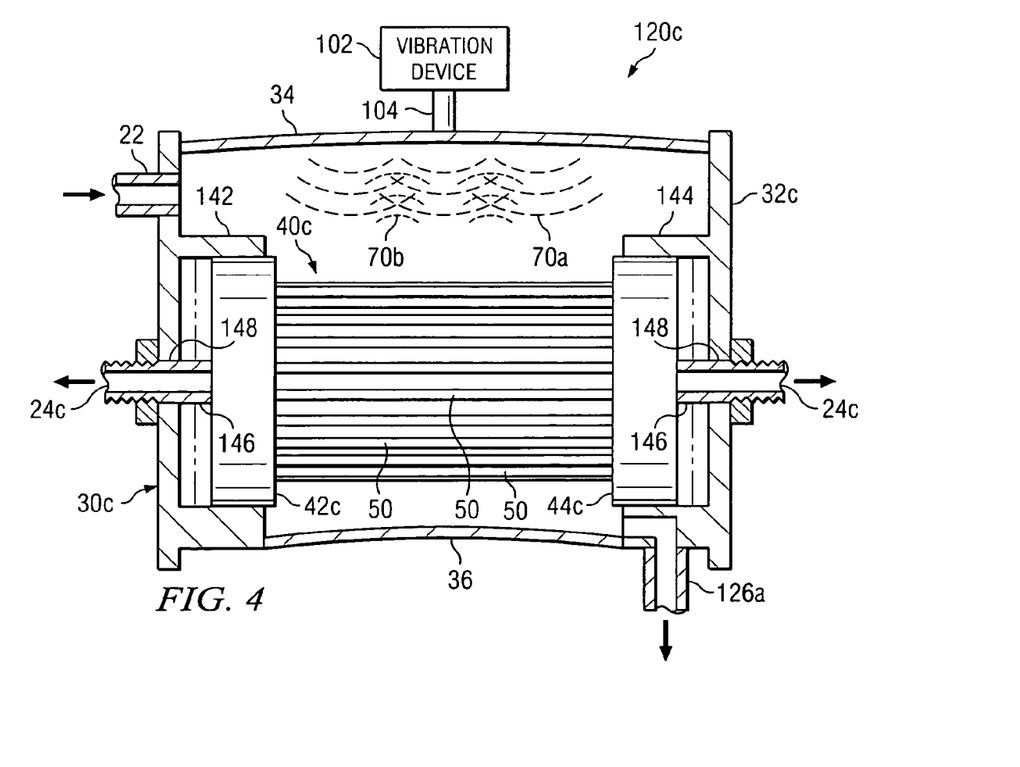
FIG. 4 is a schematic drawing in section and in elevation with portions broken away showing a filtration system having at least one array of hollow fiber membranes which may be alternately tensioned and relaxed while cleaning exterior portions of the hollow fiber membranes in accordance with teachings of the present invention.

Filtration system 120c, as shown in FIG. 4, combines various features of the previously described filtration system 120a with variable tensioning of hollow fiber membranes 50. Housing 30c preferably includes wall 32c which has been modified to accommodate variable tensioning of hollow fiber membrane array 40c. For embodiments, such as shown in FIG. 4, end caps 42c and 44c may be modified to allow reciprocating longitudinally movement relative to each other and adjacent portions of wall 32c. Movement of end caps 42c and 44c relative to each other may vary both the length and cross section of attached hollow fiber membranes 50.

For some applications, brackets 142 and 144 may be securely attached with adjacent portions of wall 32c. End caps 42c and 42c may be slidably retained within respective brackets 142 and 144. Various types of electrical and/or mechanical motors (not expressly shown) may be attached with respective shafts 146, extending from end caps 42c and 44c through respective openings 148 in adjacent portions of wall 32c. For some applications, each shaft 146 may include hollow flow path 24c extending therethrough to allow communication of clarified fluid or permeate from fluid flow path 62 of each hollow fiber membrane 50.

Vibration wave a 70a produced by vibration driver 102 may be combined with physical interference or physical scouring associated with alternately tensioning and relaxing hollow fiber membrane 50. Variable tensioning plus applying vibration energy generally perpendicular to longitudinal axis 52 of hollow fiber membranes 50 will increase shaking and shearing actions to remove any scale, solids cake and/or biological films from exterior portions of hollow fiber membranes 50. Filtration system 120 may also include previously described control system 110 and vibration canceling driver 106. Also, variable tensioning of hollow fiber membranes 50 may be satisfactorily used with an electrical vibration system.

Figure 5:
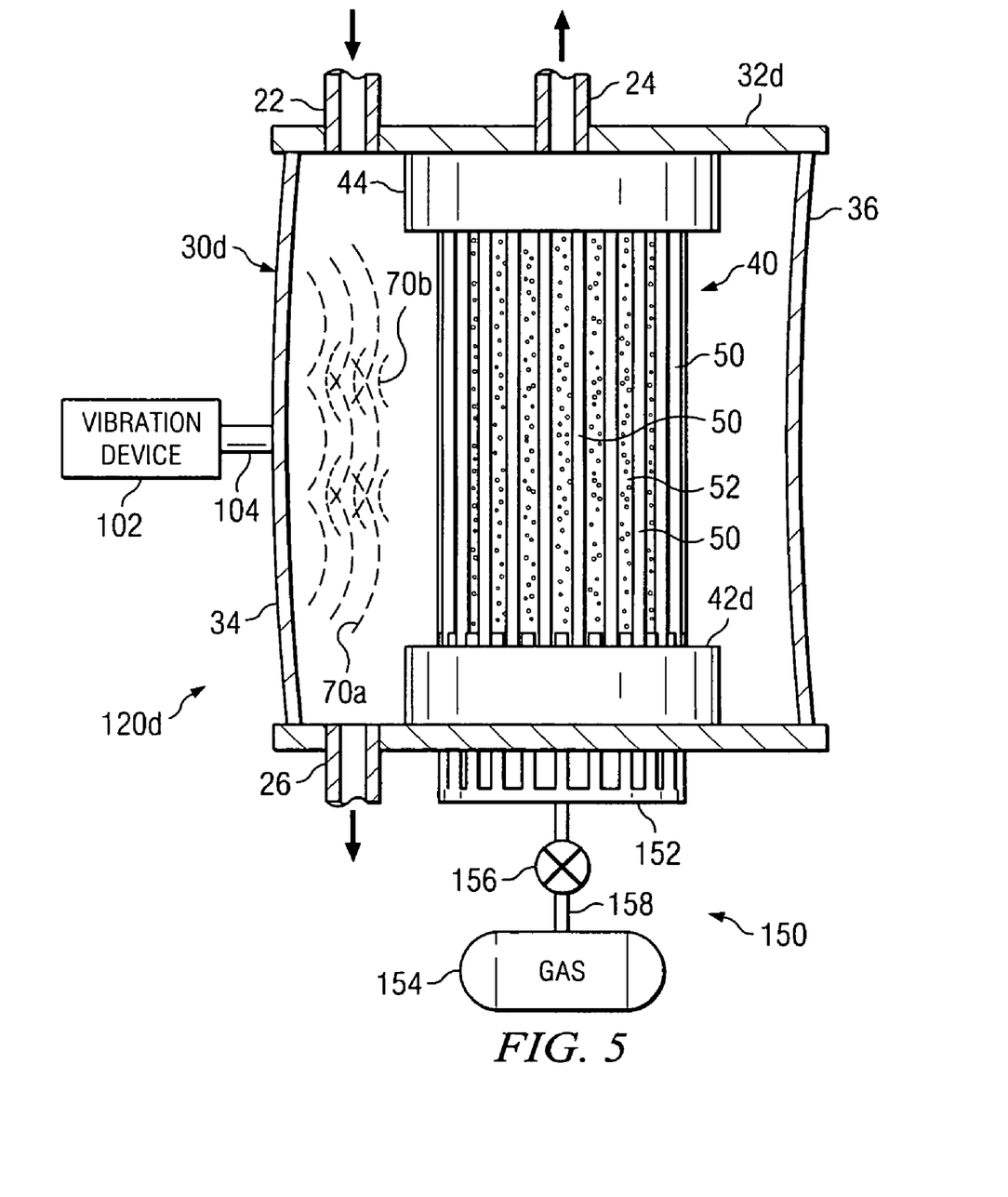
FIG. 5 is a schematic drawing in section and in elevation with portions broken away showing a filtration system having at least one array of hollow fiber membranes in combination with air bubbling and apparatus for cleaning exterior portions of the associated filter media in accordance with teachings of the present invention.

Fluid filtration system 120d, as shown in FIG. 5, combines various features previously described filtration system 120a along with a gas bubbling system 150. Housing 30e may include various features as previously described with respect to housing 30a. However, for embodiments such as shown in FIG. 5, housing 30e may be oriented with end closures 34 and 36, extending generally vertically relative to wall 32d. End cap 42d may be modified to accommodate gas flow from manifold 152. Gas bubbling system 150 may include a source 154 of relatively high pressure gas. One or more regulators 156 may be used to control the flow of gas from source 154 to manifold 152. One or more conduits 158 may be used to couple regulator 156 with manifold 152. Insert gas source 154 may provide nitrogen, air and any other suitable gas to manifold 152.

Vibration waves 70a from vibration driver 102 may be projected generally perpendicular with respect to the exterior portions of hollow fiber membranes 50. Gas bubbles from manifold 152 may flow generally parallel with hollow fiber membranes 50. The gas bubbles cooperate with the perpendicular vibration waves to increase scouring or cleaning of exterior portions of hollow fiber membranes 50.

Figure 6:
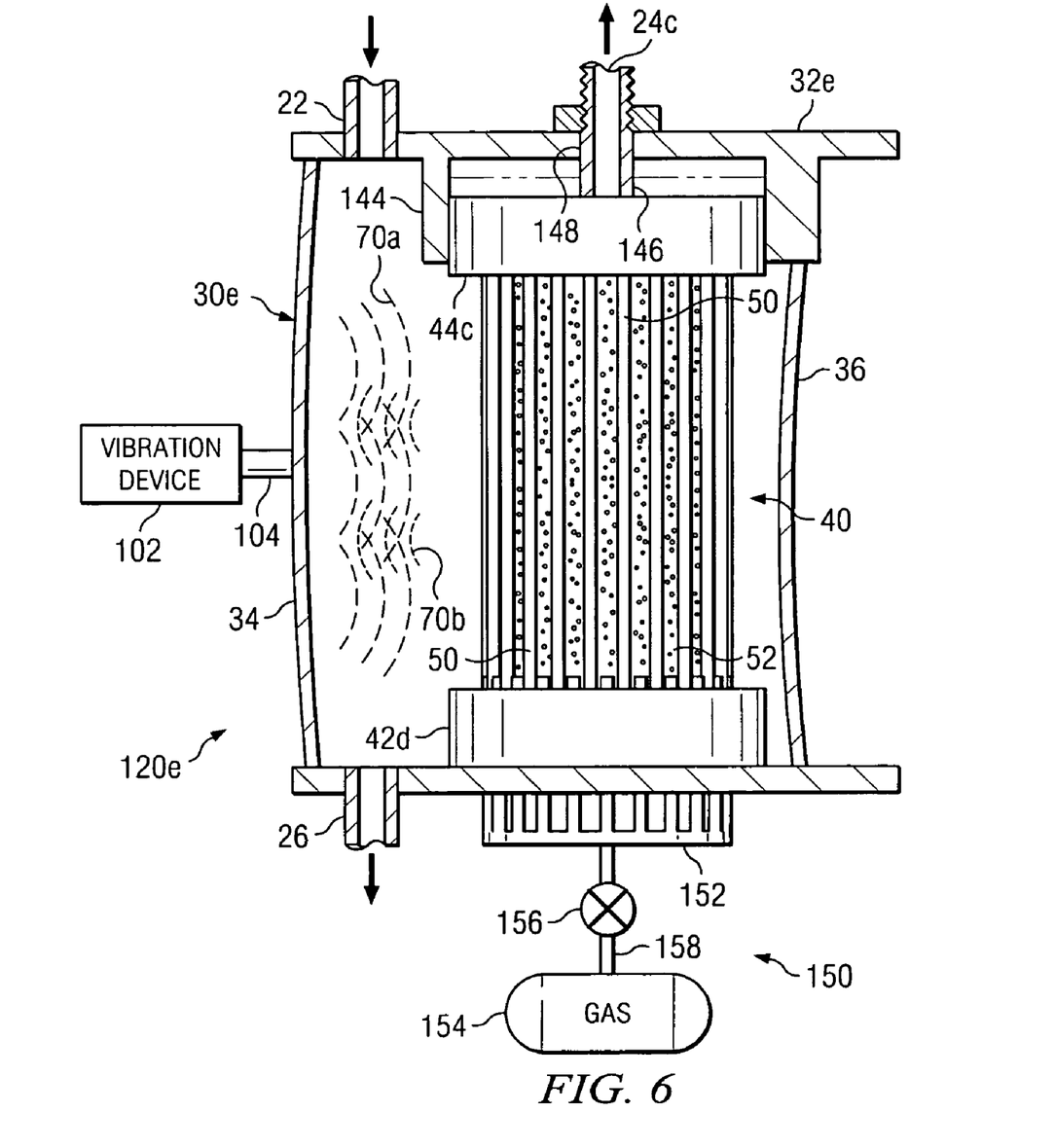
FIG. 6 is a schematic drawing in section and in elevation with portions broken away which shows a filtration system having at least one array of hollow fiber membranes which may be alternately tensioned and relaxed in combination with injecting air bubbles and acoustic or vibration ways to clean exterior portions of the associated filter media.

Filtration system 120e as shown in FIG. 6 combines various features of previously described filtration systems 120c and 120d. Exterior portions of hollow fiber membranes 50 may be cleaned by using a combination of vibration energy produced by vibration device 102, gas bubbles from manifold 152 flowing generally parallel with exterior portions of hollow fiber membranes 50 and reciprocating movement of end cap 44c to produce alternative tensioning and relaxing of attached hollow fiber membranes 50.

For some applications the removal of scale, solids cake and/or biological films may be further enhanced by using water jets (not expressly shown) or other suitable pumps (not expressly shown) to direct fluid flow generally parallel with exterior portions of hollow fiber membranes 50. Such fluid flow may be used either intermittently or continuously. Also, such fluid flow may be used in combination with bubbles from manifold 52, alternatively tensioning and relaxing hollow fiber membranes 50 and/or applying vibration energy thereto. For still other applications process fluids may be directed through one or more inlet tubes (not expressly shown) to locations disposed within each hollow fiber membrane array 40. As a result, inbound movement or flow of process fluid may be used to assist with transport of any scale, solids cake and/or biological films removed from exterior portions of hollow fiber membranes 50 by any of the previously described cleaning effects.

Filtration systems 120a, 120b, 120c, 120d and 120e may be used to treat a wide variety of process fluids. Such filtration systems may include one or more arrays of hollow fiber membranes. The arrays may be mounted in side by side relationships in a housing or in a cassette (not expressly shown). The cassette may be placed in a relatively open or unrestricted reservoir. Such cassettes may also be placed in and removed from pressurized or closed housings.

For some applications one end of the hollow fiber membranes may be attached to a mounting element such as an end cap. The hollow fiber membranes may hang from the one mounting element. For other applications both ends of the hollow fiber membranes may be attached to respective mounting elements such as a pair of end caps spaced from each other. The mounting elements may apply relatively preset or constant tension to the associated hollow fiber membranes. For still other applications both ends of the hollow fiber membranes may be attached to mounting elements operable to apply variable tension to the associated hollow fiber membranes. The amount of tension may be varied substantially continuously or may be varied intermittently during an associated dynamic filtration process.

Previously described filtration systems 120a, 120b, 120c, 120d and 120e may be further modified to improve associated dynamic filtration processes by applying a source of vacuum to associated clarified fluid outlets and/or applying pressure to associated process fluid inlets. Increasing the differential pressure applied to exterior portions of hollow fiber membranes may be used to increase the flow rate of clarified fluid or permeate through associated membrane walls 54. The amount of differential pressure may be regulated to leave selected retentate components on exterior portions of the associated hollow fiber membranes 50.

Filtration systems incorporating teachings of the present invention may be used for the following applications.

Applications in water and wastewater treatment for municipal purposes such as:
drinking water treatment;
reverse osmosis reject concentration;
reclaimed water treatment;
primary and secondary wastewater treatment; and
primary and secondary wastewater treatment sludge concentration.

Applications for water and wastewater treatment for industrial purposes such as:
ultra-pure water polishing;
process water purification;
car wash wastewater treatment and reuse;
industrial laundry wastewater treatment and reuse;
boiler feed water treatment;
industrial wastewater pretreatment;
sludge de-watering; and
scrubber effluent treatment and concentration.

Applications for water and wastewater treatment for agricultural purposes such as:
irrigation water treatment and reuse;
confined animal feeding operation wastewater treatment and reuse; and
aquaculture water treatment and reuse.

Applications in bio-manufacturing such as concentration of pharmaceutical and biotechnology products.

Applications in food and beverage processing such as:
ultra-pure water polishing;
juice concentration; and
wastewater treatment and reuse.

Applications in chemical manufacturing and process industry such as:
concentration of high solids;
calcium carbonate;
titanium dioxide;
latex emulsion and catalysts;
acid clarification;
metal hydroxide treatment;
colloidal silica filtration;
separation of othalic acid catalyst fines;
sodium hydroxide recovery; and
applications in paints and pigments industry such as white water treatment and organic and inorganic pigment washing and concentration.

Applications in the pulp and paper industry such as:
white water treatment;
box and bag plant effluent treatment;
bleach plant effluent treatment
black liquor treatment;
paper coating effluent treatment; and
green liquor treatment.

Applications in the petroleum production and refining industry such as:
recycling of petroleum;
drilling muds;
brine extraction;
cracking catalyst removal;
treatment of injection water;
produced water;
completion fluids;
process water; and
refinery wastewater treatment and reuse.

Applications in mining industry such as:
mineral clay de-watering;
red mud recovery;
mining and milling effluent treatment; and
mine tailing processing and size classification.

Other continuous filtration applications for the chemical industry, kaolin manufacture, metal casting industry, sludges from waste gas scrubbing, aluminum industry, steel industry and other materials processing industries.

Although the present invention and its advantages have been described in detail, it should be understood that various changes, substitutions and alternations can be made herein without departing from the spirit and scope of the invention as defined by the following claims.

What is claimed is:

1. A filtration system operable to separate a process fluid into a clarified fluid and a concentrated fluid comprising:
    a housing having at least one inlet operable to receive the process fluid;
    the housing having at least a first outlet for the concentrated fluid and a second outlet for the clarified fluid;
    at least one array of hollow fiber membranes disposed within the housing;
    each hollow fiber element having a first end and a second end spaced from each other;
    exterior portions of each hollow fiber element exposed to contact with the process fluid and operable to separate the process fluid into the concentrated fluid and the clarified fluid;
    a flow path coupling interior portions of each hollow fiber membrane with the second outlet to allow clarified fluid to exit from the housing;
    a first energy source operable to vibrate the hollow fiber membranes without interruption of an association filtration process; and
    energy absorbing material disposed within the housing opposite from the energy source.

2. The filtration system of claim 1 further comprising a plurality of arrays of hollow fiber elements.

3. The filtration system of claim 1 further comprising the energy source selected from the group consisting of a linear reciprocating mechanical vibrator, an ultrasonic energy vibrator or a sonic energy vibrator.

4. The filtration system of claim 1 further comprising vibration energy from the energy source directed substantially perpendicular to each hollow fiber membrane.

5. The filtration system of claim 1 further comprising the housing open to ambient pressure.

* * * * *